Aug. 12, 1969   R. W. LEWIS ET AL   3,461,261
HEATING APPARATUS

Filed Oct. 31, 1966   12 Sheets-Sheet 1

FIG.1

INVENTORS
RICHARD W. LEWIS
JEROME R. WHITE

BY   Harry J. McCauley

ATTORNEY

FIG.2

TE MODES IN CYLINDRICAL CAVITIES

FIG.3

FIG.4 — MODE CHART FOR RIGHT CIRCULAR CYLINDER

Aug. 12, 1969   R. W. LEWIS ET AL   3,461,261
HEATING APPARATUS

Filed Oct. 31, 1966   12 Sheets-Sheet 9

INVENTORS
RICHARD W. LEWIS
JEROME R. WHITE

BY  *Harry J. McCauley*

ATTORNEY

FIG. 14

| RESONANT PEAK | MODE | FREQUENCY |
|---|---|---|
| N | TE 116 | 2416 |
| M | TM 010 | 2435 |
| * - | TE 117 | 2452 |
| P | TM 110 | 2470 |

* (TE117 BARELY EXCITED - DID NOT SHOW ON TRACE)

INVENTORS
RICHARD W. LEWIS
JEROME R. WHITE

BY Harry J. McCauley

ATTORNEY

INVENTORS
RICHARD W. LEWIS
JEROME R WHITE

BY Harry J. McCauley

ATTORNEY

United States Patent Office 3,461,261
Patented Aug. 12, 1969

3,461,261
HEATING APPARATUS
Richard W. Lewis, Wilmington, Del., and Jerome R. White, San Carlos, Calif., assignors to E. I. du Pont de Nemours and Company, Wilmington, Del., a corporation of Delaware
Filed Oct. 31, 1966, Ser. No. 590,917
Int. Cl. H05b 9/06
U.S. Cl. 219—10.55                                12 Claims

ABSTRACT OF THE DISCLOSURE

A resonant cavity microwave dielectric heating apparatus operating in the $TM_{01n}$ mode, where $n$ is an integer in the range of 0–5, comprising an elongated cylindrical chamber provided with a waveguide propagating the electric (E) field of microwave power substantially parallel to the axis of the chamber, the waveguide additionally incorporating an iris to maintain resonance within the chamber during operation as a dielectric heater for material transported axially of the chamber.

---

This invention relates to heating and an apparatus therefor, and particularly to a dielectric heating method employing a resonant cavity-type dielectric heater useful for the rapid heating of running threads, tows or webs.

Heating of dielectric materials by the use of microwaves is an old technique; however, a common difficulty with microwave resonant structures used as heating apparatuses is that they are markedly unstable in operation, being affected by variations in the process material passing through them, interaction back with their microwave sources, or unpredictable shifting in operation from an advantageous operational mode to some other mode which is completely ineffective for heating. Under these circumstances, although extensive prior art exists in the field, dielectric heating has had restricted application in industry, and particularly in environments requiring precise and stable temperature control.

Objects of this invention are to provide an improved method of dielectric heating and a design of resonant cavity of very high stability which is especially adapted to the heating of running threads, tows or webs, and also heating apparatus compact in size and highly efficient in energy utilization, particularly suited to the processing of temperature-sensitive polymers and the like, including also low-loss substances. The manner in which these and other objects of this invention are achieved will become apparent from the following detailed description and the drawings, in which:

FIG. 17 is a longitudinal section of a preferred design of cylindrical chamber cavity provided with a low dielectric loss process material containment tube of a construction adapted to resonance tuning while

Generally, this invention comprises a method of dielectric heating and a resonant cavity microwave dielectric heating apparatus adapted to operate in the $TM_{01n}$ mode, where $n$ is an integer in the range of 0 to 5, comprising an elongated cylindrical chamber provided with a waveguide coupled therewith in a manner propagating the electric (E) field of microwave power introduced therethrough substantially parallel to the axis of the chamber, the waveguide having an iris interposed across its juncture with the chamber of cross-sectional aperture preselected to maintain resonance within the chamber during operation as a dielectric heater of process material to be heated having a predetermined dielectric loss factor, and means for process material insertion and throughput generally within the axial region of the chamber.

At the outset, it is helpful to an understanding of this invention to consider briefly the several general modes of microwave propagation which can be preserved within circular cross-section closed-end waveguides, FIG. 2 relating to the transverse magnetic modes specifically, hereinafter abbreviated TM, whereas FIG. 3 relates to the transverse electric modes specifically, abbreviated TE. In order to further subclassify the modes, the convention is to append three subscript numbers thereafter, the first referring to the total number of full periodic variations in the field along a circular path concentric with the cylindrical wall, the second is one more than the total number of sign reversals of the field along a radial path and the third (hereinafter sometimes denoted $n$ for generality) is the number of nodes which exist in an axial direction. The use of the term "transverse" refers to the spatial position of the field vector in relation to the axial direction of energy propagation and, since it is desired, of course, to maintain a concentrated axial electric energy propagation for the heater of this invention, operation is advantageously confined to transverse magnetic modes.

Figure 2:
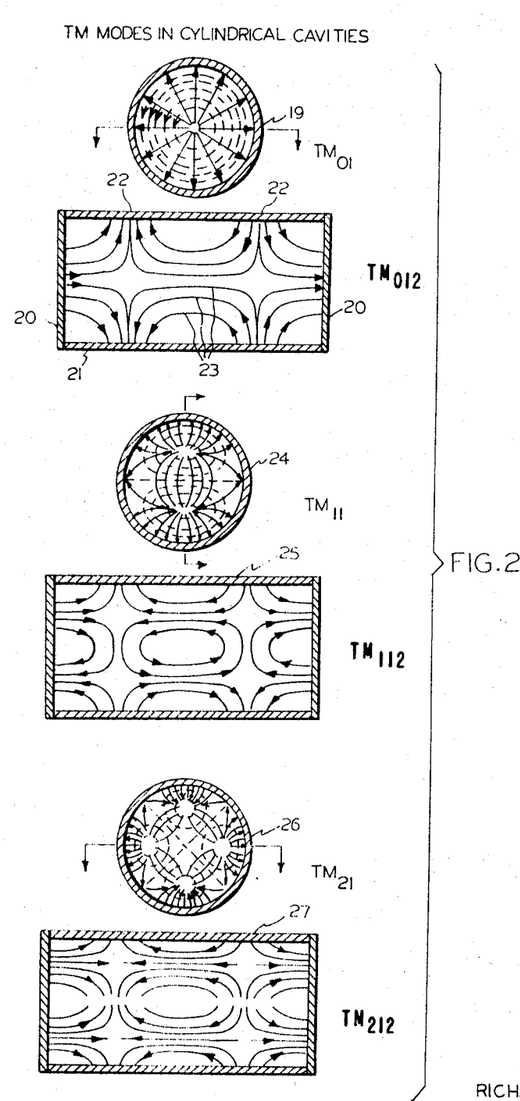
FIGS. 2 and 3 are transverse and longitudinal section views (each of the latter being taken on the sections indicated in the adjacent transverse showings thereabove) of closed-end cylindrical cavities showing diagrammatically the electric and magnetic field dispositions for representative TM modes of energy propagation, as regards FIG. 2, and representative TE modes of energy propagation as regards FIG. 3.
Figure 3:
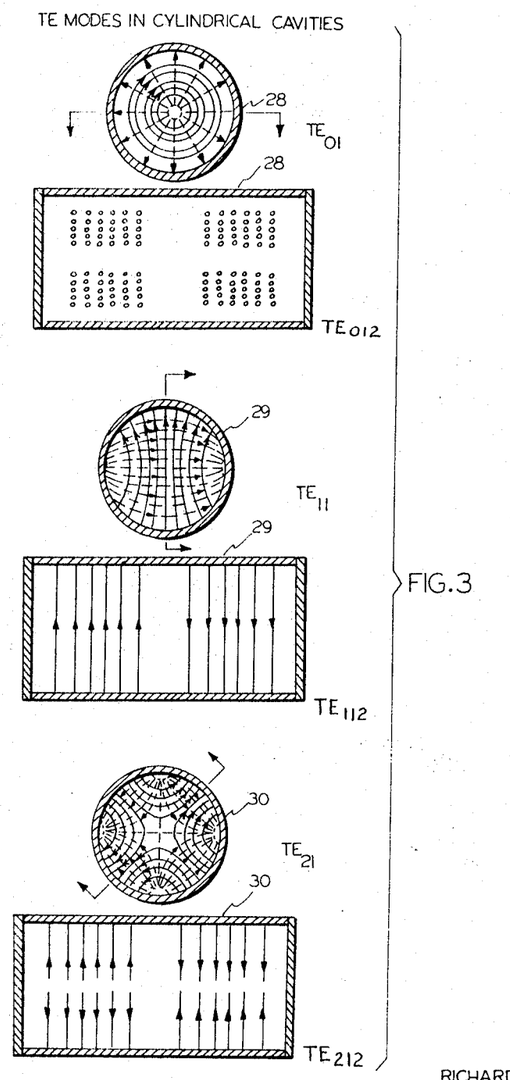

In FIGS. 2 and 3 and elsewhere throughout this description (except in FIG. 13), the electric field lines are represented by solid lines, whereas magnetic field lines are represented in broken line convention.

Thus, referring to the top two showings of FIG. 2, a circular waveguide cross-section 19 operating in the $TM_{01}$ mode has no periodic variation in magnetic field along a path concentric with the wall, thus the first subscript is zero, and no sign reversals of the magnetic field in a radial direction, hence the second subscript is simply 1, since the convention requires adding the integer 1 to the number of existing sign reversals.

If the ends of the cylindrical section 21 are closed off by conducting plates 20 and if the length and diameter are properly proportioned, two nodes 22 are formed and the cavity is then resonant in the $TM_{012}$ mode. The solid electric field lines 23 are axially disposed with highest concentration along the longitudinal axis of section 21. Actually, the electric field in this mode varies from zero at the walls to a maximum at the section longitudinal axis in an approximate half sine wave manner, although this is not apparent from the drawings. However, a running yarn passed through cavity 21 along the cylinder axis traverses the region of uniform maximum electric field intensity and is subjected to dielectric heating in accordance with the relationship $Q \propto FLE^2$, where Q is heating rate,
F is frequency of the electric field,
L is the dielectric loss factor of material within the field, and
E is the electric field intensity.

From the relationship, it will be seen that field intensity has a second power effect on the heating, making concentration of the electric field in a well-defined accessible region extremely desirable. Operating in air at atmospheric pressure, the intensity E must be kept below the breakdown potential of about 50,000 volts r.m.s./in.

In contrast, frequency F has only a directly proportional effect on heating rate. Finally, the dielectric loss of the process material is a natural characteristic over which there is little control, and therefore this cannot be manipulated significantly to vary the heating rate.

The $TM_{11}$ mode is depicted in cross-section at 24 and, as $TM_{112}$, in closed end longitudinal section 25, whereas the $TM_{21}$ and $TM_{212}$ modes are shown at 26 and 27, respectively. From these latter it is clear that no axial electric field is developed, so that dielectric material passed axially through the cavities of these modes would not be heated. Nor does there exist any other conveniently accessible high concentration field regions for these modes, rendering them essentially useless for the purposes of this invention.

Referring now to FIG. 3 and the several TE modes there depicted, the $TE_{01}$ mode of sections 28 develops no electric field which can be utilized to heat dielectric material running axially of the cavity. Although the $TE_{11}$ modes of sections 29 does develop some electric field lines passing through the cylinder axis, which would intersect a yarn line disposed there, these field lines would encounter only the smallest, i.e., radial, dimension of the material to be heated and would thus be largely ineffective because the field intensity within the material would be small, making the heating rate low. The $TE_{21}$ mode of section 30 is even less desirable, because of the total absence of field lines in the axial region.

From the foregoing, it will be understood that the resonant $TM_{01n}$ mode is definitely preferred for heating materials axially disposed within a cavity, and the cavity design of this invention is directed to achieving this. It might be added that modes, such as $TM_{02n}$, $TM_{03n}$, etc., develop axial electric fields which are effective to produce desirable heating rates; however, serious problems of mode separation to safeguard against inadvertent shift of the operation to some neighboring undesired mode make these less attractive.

Figure 4:
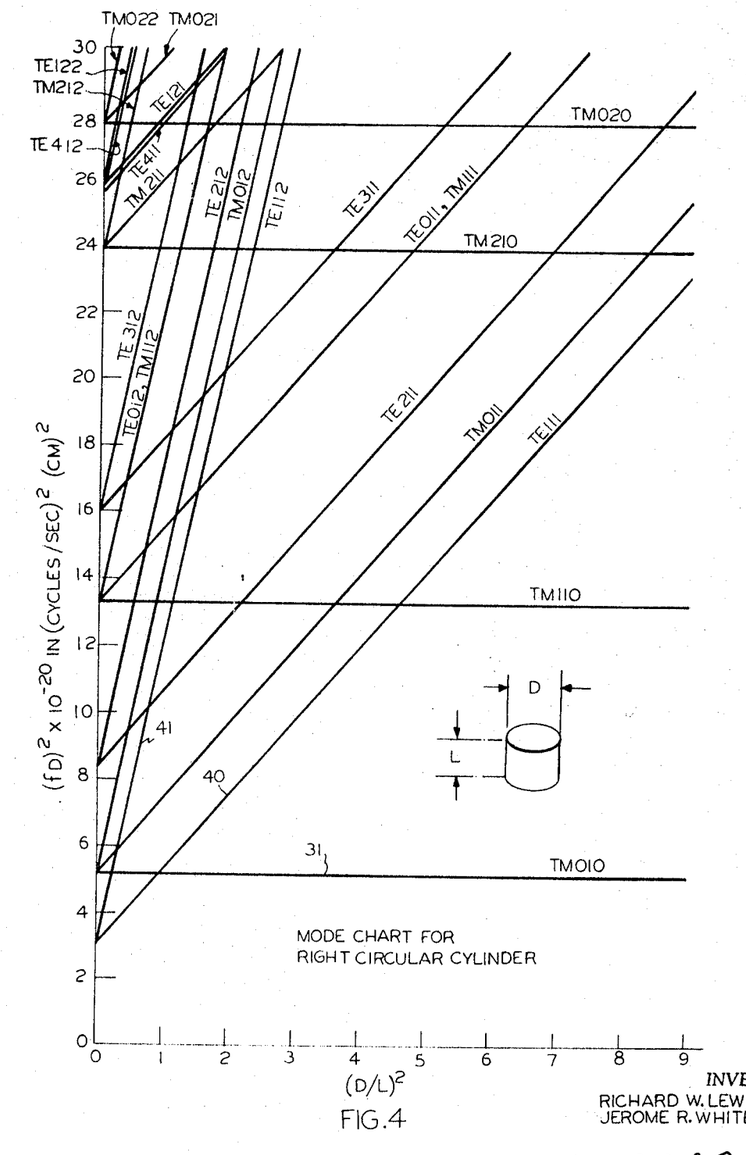
FIG. 4 is a plot of the proximity relationship of numerous TM and TE modes for a right cylinder design of cavity in terms of (1) cylinder diameter and length, and (2) frequency.
Figure 5:
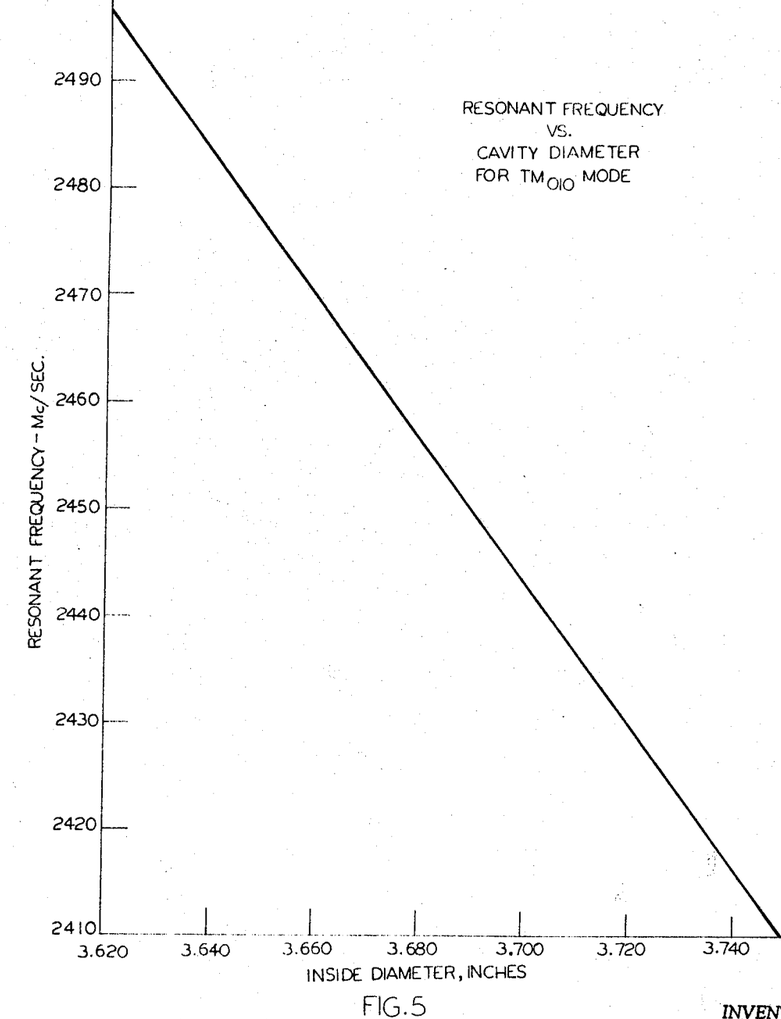
FIG. 5 is a plot of resonant frequency versus cavity inside diameter for a right cylindrical cavity operating in the $TM_{010}$ mode.

This will be clear from FIG. 4, which shows the progressively closer adjacency of successive modes above $TM_{010}$, the latter being not only dependent on cavity diameter solely, as the horizontal line plot reveals, but also being most isolated relative to other mode lines. By way of example, a resonant cavity 31 in the $TM_{010}$ mode has a diameter D of 3.690" for a frequency of 2450 mc./sec., thus making it possible to excite any length cavity in resonance if it has this diametrical dimension. FIG. 5 shows that the diametrical dimension is relatively critical to the obtainment of resonance, a change in the effective diameter of a $TM_{010}$ cavity designed for operation at 2450 mc./sec. of only 0.0015" causing a shift of cavity resonant frequency by 1 mc./sec. A disadvantage of other modes, including the $TM_{011}$ and $TM_{012}$ modes also, is their dependency on length as well as diameter for operating frequency selection, as indicated by the slopes of the respective line traces, this length dependency becoming greater with increasing axial nodal number.

Figure 6:
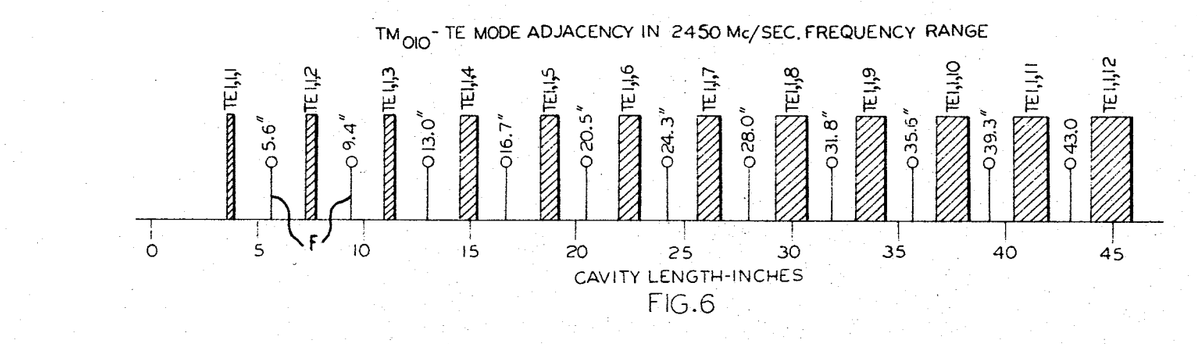
FIG. 6 is a graphical depiction of the occurrence of TM and TE modes as a function of cavity length for the microwave frequency range of 2400–2500 mc./sec.

The optimum node choice then is $TM_{010}$, since it is farthest removed from all other modes which conceivably can cause trouble, the only exceptions arising out of changing cavity lengths being the $TE_{11n}$ modes, e.g., 40 ($TE_{111}$) and 41 ($TE_{112}$) and others not shown, which are close to the ordinate, which, with decreasing diameter-to-length ratios (i.e., $D/L$), bring these modes into closer proximity. The progressively increasing tendency for this to occur with decrease in $D/L$ ratio is shown in FIG. 6 where the shaded areas indicate cavity lengths where both the $TM_{010}$ mode and a particular TE mode could be excited in a cylindrical cavity with a diameter selected for resonance at 2450 mc./sec. Also shown are cavity lengths (denoted as knobbed spikes F) for which the $TM_{010}$ mode of cavity resonance can exist at 2450 mc./sec. with a ±50 mc./sec. range without excitation of the TE mode, and it is seen that $TM_{010}$ cavity resonance with this ±50 mc./sec. range of marked isolation from adjacent TE modes is attainable over relatively long cavity lengths, and certainly over lengths more than adequate for very effective heating, even of process material clearing the cavities at relatively high velocities.

A final advantage of the $TM_{010}$ mode is that, as shown in FIG. 4, it requires the smallest diameter of cavity for resonance, and this compactness can be highly desirable where space is limited, as where a number of closely running thread lines are to be heated simultaneously.

As a practical matter, $TM_{01n}$ modes wherein $n$ is an integer in the range of 0 to 5 are effective for the purposes of this invention.

It is also desirable to utilize cavities of such length that resonance in the desired mode can be achieved throughout a range of frequencies, as shown in FIG. 6, for example. The reason for this is that frequency shifting by the power generator is then easily accommodated, since resonance in the $TM_{010}$ mode is assured regardless of whether the power frequency remains at precisely the design level. Power tubes such as magnetrons are susceptible to frequency shifts, and it is imperative that the $TM_{010}$ operational mode be preserved in spite of such shifts. If this is done, frequent replacement of expensive power tubes is largely avoided and, moreover, when eventual replacement is required due to absolute tube failure, "off-the-shelf" substitution is often practicable, thus obviating special matched tube selection and the like which is both troublesome and expensive.

Turning now to a preferred design of end-powered resonant cavity according to this invention, FIGS. 1, 7, 7A and 7B detail this construction. The resonant cavity is generally denoted as 14, this comprising a cylindrical portion 47 of length and diameter preselected to maintain resonance in the $TM_{010}$ mode for the particular microwave frequency range which is to be utilized. The cavity ends are closed off by frustoconical end pieces 48 and 49, these having slopes of 10–30° with reduced openings oriented outwardly, end piece 49 being provided with a choke 18 of length greater than $\lambda/4$ (typically 3″ for 2450 mc./sec. operation) in order to minimize energy radiation from the cavity. Opening 43 of end piece 49 is oriented coaxially with the longitudinal center line of cylinder 47 and has a diameter of, typically, ¼″–1″, i.e., sufficient to permit easy passage of the strand product to be heated while still being small enough to bar the ingress of any foreign objects from the outside.

End piece 48 is in many respects similar to 49, except that its central opening 44 is an arcuately rounded aperture of diameter carefully preselected to constitute an iris essential to the critical coupling in $TM_{010}$ mode in order to preserve resonance for most effective heating of the specific material to be processed. The dielectric loss factor L of the particular material which it is desired to heat has an important effect on the diameter of iris 44, as can be seen from FIG. 9, low loss materials such as polyester resins denoted by curve A requiring little change in iris diameter with fiber denier, whereas a material such as a spandex fiber, the characteristic for which is plotted in curve D requires a relatively large magnitude change in iris size for a relatively small denier range. It is significant that all four of the materials, polyesters (A), acrylics (B), polyamides (C) and spandex (D), have approximately the same dielectric constant, but differ in their individual dielectric loss characteristics.

It is significant, in iris choice, that any water present in the material in process constitutes a "lossy" material, and therefore its effect per se on the iris specification is substantial. The choice of iris will be governed by the influence of the amount of water on the effective loss of the specific polymer in process.

Figure 1:
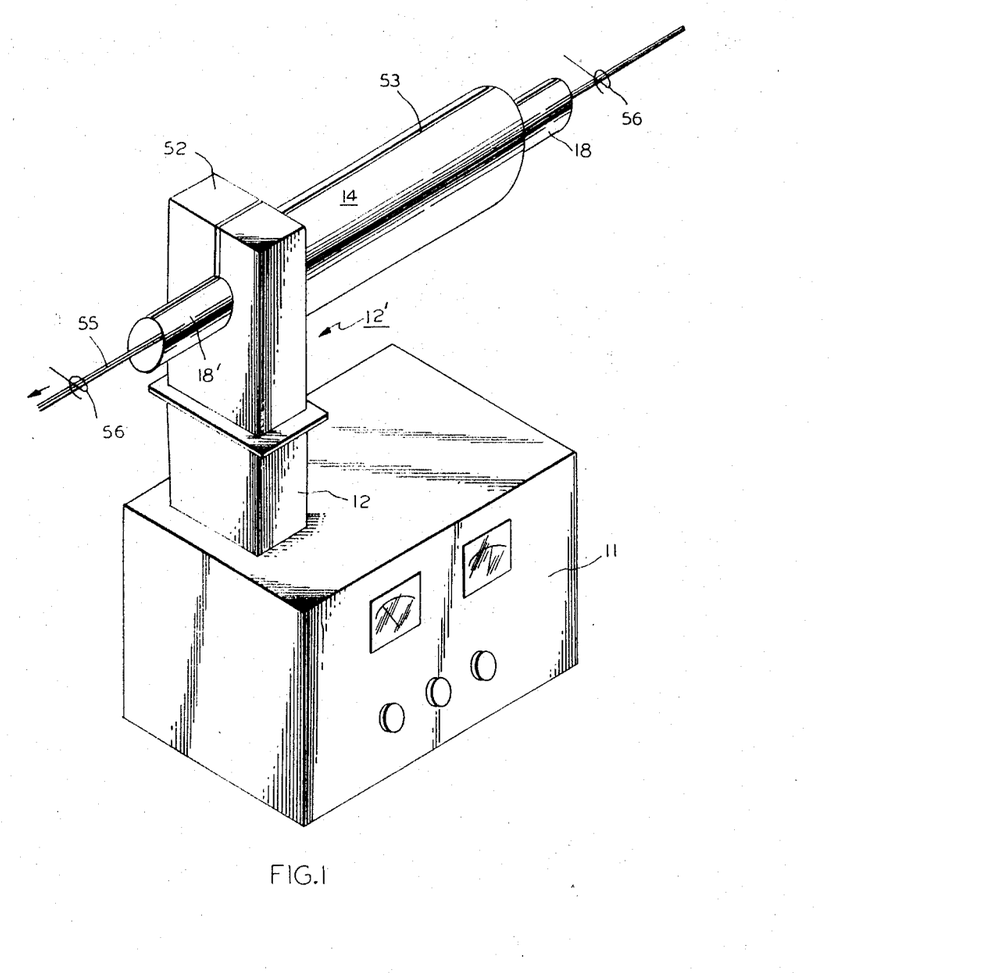
FIG. 1 is a preferred embodiment of apparatus according to this invention with power introduction accomplisheded via an end-mounted waveguide.

The power source 11 shown in FIG. 1 is a conventional CW (continuous wave) magnetron power source coupled to cavity 14 through a rectangular waveguide section 12, the energy being launched into cylindrical section 47 via a flanged end waveguide extension 12′ closed off at the terminal end by a wall 52. It is preferred that all surfaces, such as wall 52 and the side walls 12a and 12b (FIGS. 7, 7A and 7B), respectively, of the waveguide extension 12′ be disposed so as to be tangent to a circle of radius $\lambda g/4$ (where $\lambda g$ is the wavelength in the waveguide and $\lambda$ is the free space wavelength) drawn in a plane transverse the axis of chamber 47 as shown in FIG. 7A in order to create the maximum field intensity at orifice 44, and with a minimum voltage gradient around the edges of this orifice.

Figures 7, 8, 10:
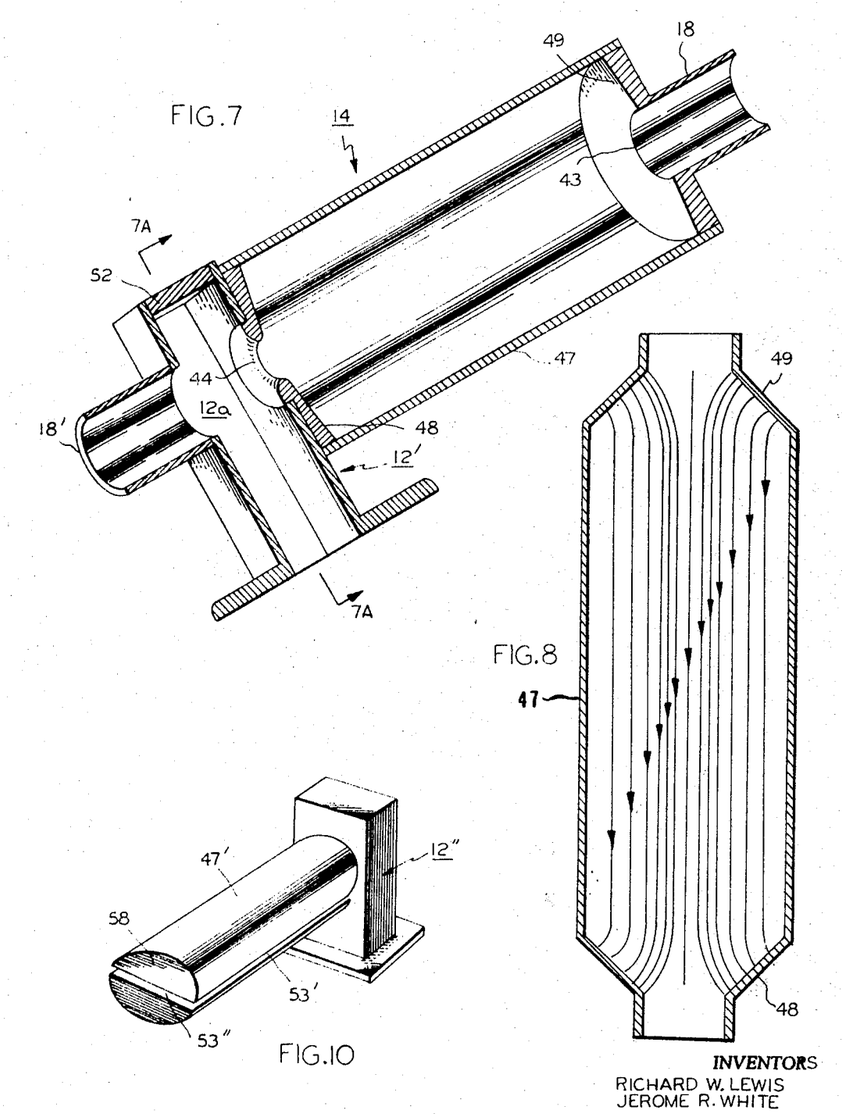
FIG. 7 is a perspective side-elevational sectional view of the resonant cavity of the apparatus of FIG. 1.
FIG. 8 is a schematic sectional view of a cylindrical cavity having tapered ends, showing the electric field disposition maintained therein ($TM_{010}$ mode) and also the effect of tapering the end closures.
FIG. 10 is a perspective view of an embodiment of apparatus of the design of FIGS. 1, 7, 7A and 7B adapted to the heating of running film-form material.

It is preferred to provide a choke 18′ in line axially with iris 44 in the wall of waveguide extension 12′ remote from cavity 47, which can be in all respects identical with choke 18 already described.

Figure 7A:
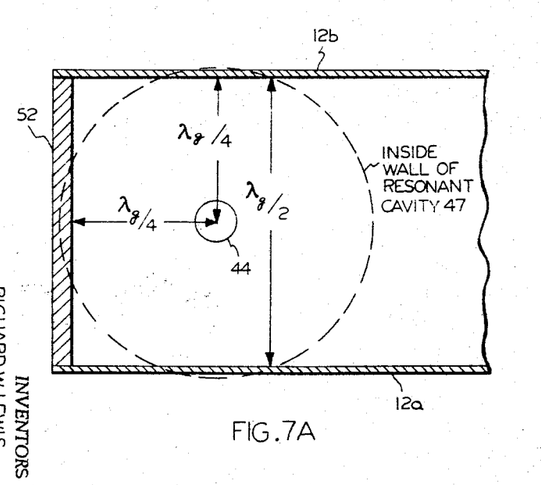
FIG. 7A is a full sectional view taken on line 7A—7A of FIG. 7 with all details of the associated cylindrical chamber cavity omitted except for a broken-line representation of the inside diameter of the cavity.
Figure 7B:
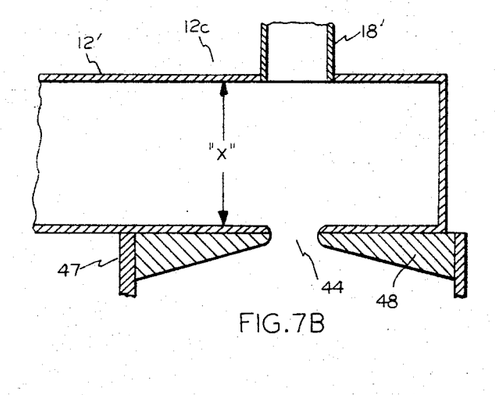
FIG. 7B is a fragmentary horizontal sectional view in plan taken diametrically of the power input end portion of the apparatus of FIG. 7.

The usual commercial waveguide manufacturing practice utilizes an "X" dimension, FIG. 7B, which is ½ the width of the waveguide, i.e., the 12a wall-to-12b wall separation of FIG. 7A which, in this instance, is $\lambda g/2$. However, so far as operation according to this invention is concerned, the "X" dimension is not particularly critical so long as it is less than the waveguide width (this being necessary to maintain the E field parallel to the "X" direction). As "X" is diminished below ½ width, the power level which can be transmitted without breakdown and arcing in the guide is reduced, dictating the preferred choice at about ½ the width as a matter of accepted waveguide design.

Arcing is also a serious problem as regards the interior of cavity 47 and this is overcome by the outward taper of end walls 48 and 49 hereinbefore referred to.

As shown in FIG. 8, the electric field lines are, with this construction, diverted outwardly so as to terminate perpendicularly with respect to the cavity end walls, thereby affording a reduced arc proneness with respect to the axial regions at the ends where product enters and leaves the apparatus. It is, of course, not necessary that ends 48 and 49 be frusto-conical in form, as they can equally well be spherical, or of other shapes functioning in a manner similar to that described as regards electric field lines.

Some means of quickly threading product 55 (FIG. 1) through the apparatus is highly desirable, and this can simply be a thin longitudinal slot 53 cut through the wall of resonant cavity 14, the end pieces 48 and 49, waveguide extension 12′ and chokes 18 and 18′ being similarly slit in prolongation as indicated. Such a slot also affords a convenient way of tuning the cavity, since, as described with reference to FIG. 5, resonance is a critical function of diameter. Thus, the cavity can be contracted or expanded peripherally to effect this control by reducing or increasing the width of slot 53 using externally mounted clamps or expanders not shown.

The running strand subjected to heating is preferably guided against lateral deviation from course by providing it with conventional pigtail guides 56 disposed upstream and downstream from the mouths of the chokes 18 and 18′, respectively.

A preferred design of apparatus for film heating is that shown in FIG. 10, wherein the product throughput is transverse the axis of the cavity chamber 47′ via slot 53′, which is, in this instance, cut completely through the chamber on a diametrical plane. For ease in product introduction, the tapered end wall 58 is also slotted at 53″ on a common plane with slot 53′, providing outboard freedom for reception of the film from the left. Power introduction is from the right-hand end, via waveguide extension 12″ in identical manner to that already described with reference to FIGS. 7, 7A and 7B.

Figure 11:
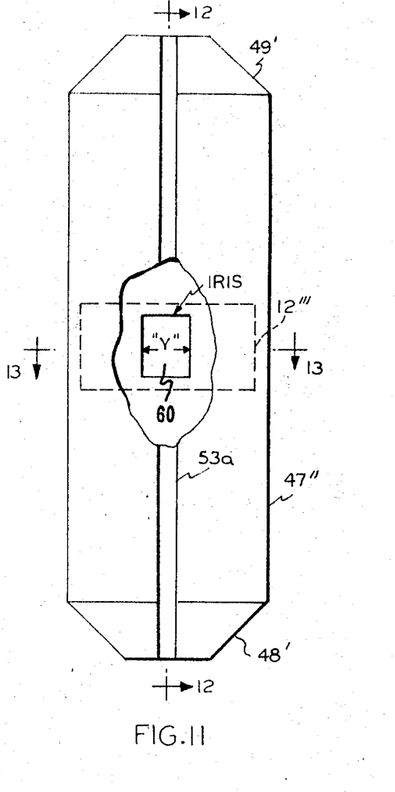
FIG. 11 is a top plan partially cut away view of a preferred embodiment of apparatus according to this invention with power introduction accomplished via a side-mounted waveguide entering from the bottom as seen in this view.
Figure 12:
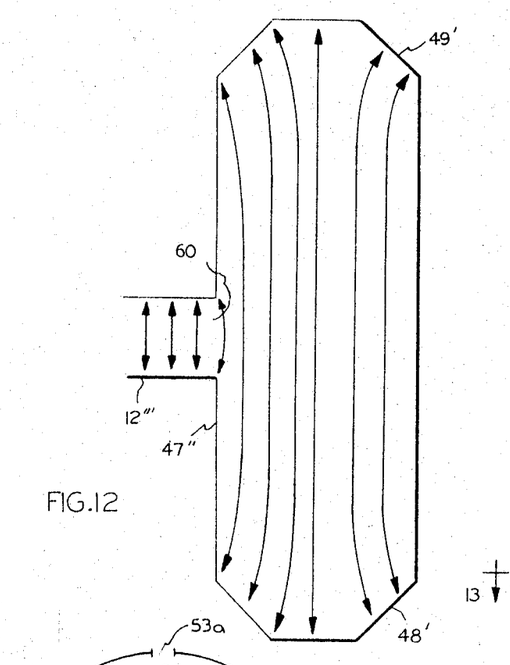
FIG. 12 is a sectional view taken along line 12—12 of FIG. 11 showing, diagrammatically, the electric field distribution existing within the apparatus of FIG. 11 when operated in the $TM_{010}$ mode.
Figure 13:
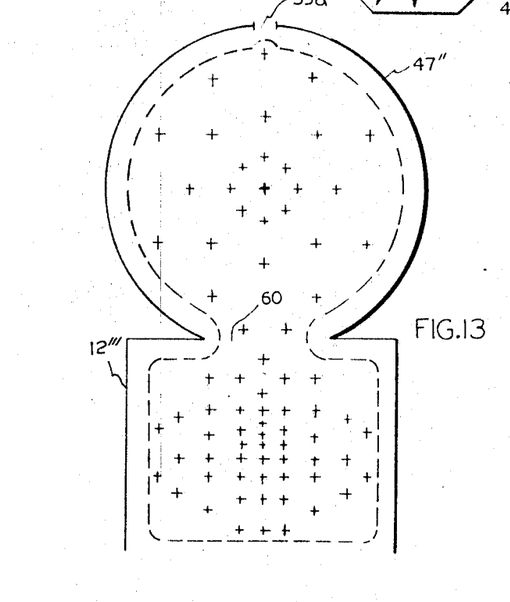
FIG. 13 is a transverse sectional view taken on line 13—13 of FIG. 11, showing, diagrammatically, the electric and magnetic field distributions existing within the apparatus of FIG. 11 when operated in the $TM_{010}$ mode.

In some situations it is advisable to introduce the power through the side wall of the cavity chamber, and this is readily done with the $TM_{010}$ mode apparatus of FIGS. 11–13, inclusive. Here the waveguide extension 12‴ discharges interiorly of the cavity chamber 47″ transverse the axis thereof, the chamber being in all respects similar to 47, FIG. 7, and provided with outwardly tapered ends 48′ and 49′ as already described. A suitable iris 60 is provided for critical coupling of the energy into the cavity, the electric field line longitudinal pattern of which is drawn in generally with solid, double-arrow lines in FIG. 12, and both the electric and magnetic field line transverse pattern is represented diagrammatically in FIG. 13, where crosses represent in end view the electric field lines, and the dashed line represents one of the magnetic field lines. Again it will be seen that a very high electric field concentration is maintained axially of the cavity chamber, permitting rapid controlled heating of a running yarn passed longitudinally therethrough. The design incorporates a thread-up slot 53a for facilitating product introduction.

It will be noted that a rectangular iris 60 is employed when power introduction is through the side, and it is essential, for best operation, that the iris be disposed 180° opposite from and symmetrically in a lateral sense with respect to thread-up slot 53a in order to eliminate the voltage gradient across the slot and thus minimize radiation losses at this point.

Where a rectangular waveguide 12''' is employed, it is oriented midway (for $TM_{010}$ operation) and perpendicular to the axis of cavity 47'' with the short dimension of the waveguide parallel to the cavity axis. If iris 60 then has one dimension equal to the short dimension of the waveguide, the other dimension, denoted "Y," is chosen to provide the critical coupling for the type of heating load which is passed through the cavity. If a different value of this iris dimension is chosen, then a different value of "Y" can be determined.

Referring to FIG. 12, the electric field is propagated through waveguide 12''' perpendicular to the long dimension of the waveguide, and this parallel to dimension "Y," so that, as the field enters the cavity, the abrupt geometric discontinuity from waveguide 12''' to cylinder 47'' causes a bowing or curving of the field in the region of the iris. In fact, it is believed that side entry power introduction causes a slight distortion of the normally axial field associated with the $TM_{010}$ mode of resonance, as evidenced by a significant radiation of energy from the string-up slot when coupling is effected at any peripheral point except directly opposite the slot.

However, with the design of FIGS. 11–13, the magnetic field expands into the cavity in a group of concentric ring-like lines (see FIG. 13) which encircle the electric field lines in normal orthogonal relationship to create the longitudinal electric field of the TM modes within the structure.

Figure 9:
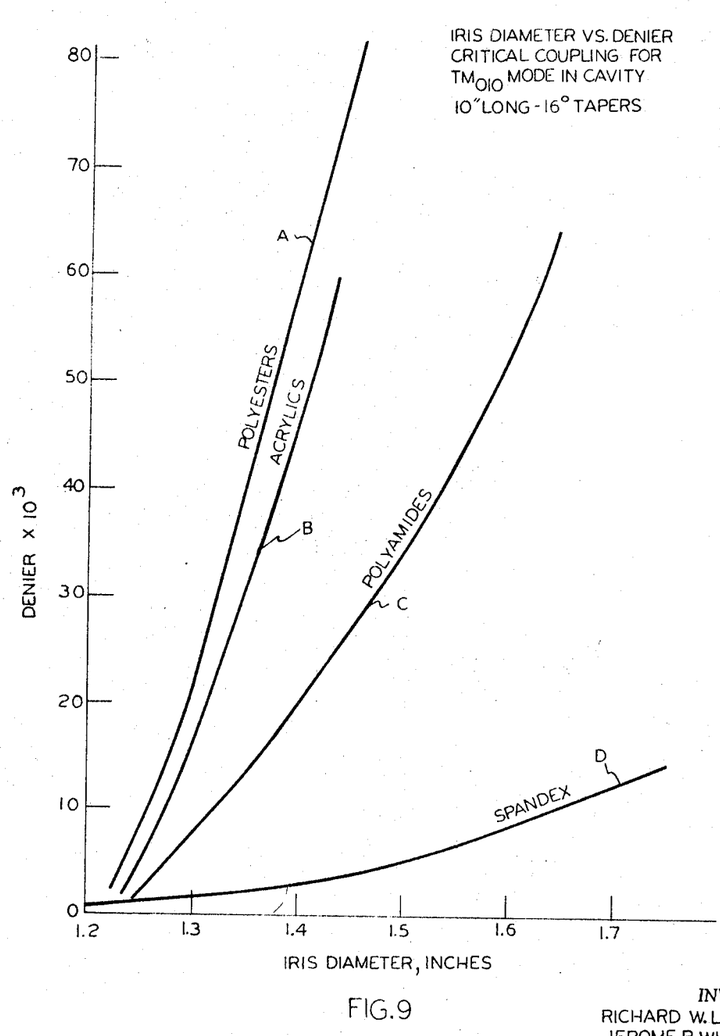
FIG. 9 is a plot of iris diameter versus denier in order to effect critical coupling of operation in the $TM_{010}$ mode for four typical polymeric yarn materials using the apparatus of FIGS. 1, 7, 7A and 7B.
Figure 14:
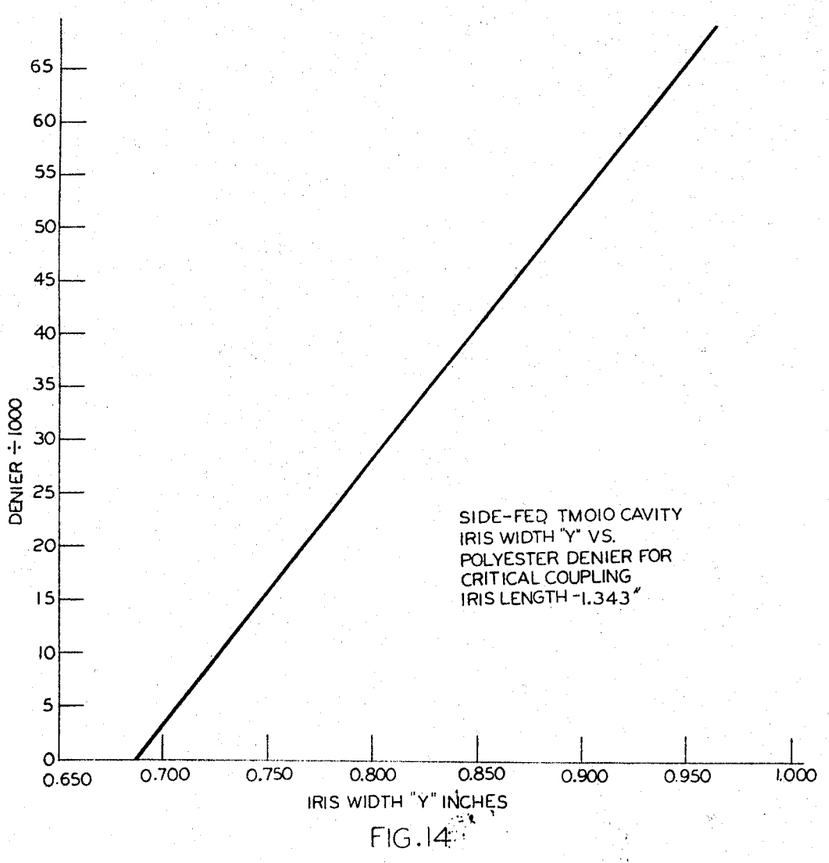
FIG. 14 is a plot of iris width versus polyester fiber denier for critical coupling of a side-fed $TM_{010}$ mode cavity apparatus of the design of FIG. 11.

The criticality of iris width in side-fed coupling power introduction is demonstrated for a typical rectangular iris of 1.345'' length by FIG. 14, applicable to polyester yarn, the denier of which is plotted as ordinate. The slope of this plot is quite close to that of plot A, FIG. 9, showing the close agreement which exists between round and rectangular irises in the end-fed and side-fed embodiments of this invention.

An advantage of the side-fed embodiment of this invention is that relatively large tapers of the end pieces 48' and 49' (e.g., 50° or more) are feasible in comparison with somewhat smaller tapers for the end-fed apparatus. That is, tapering beyond the 10°–30° approximate range for the latter usually necessitates larger iris openings for critical couplings with various heating loads, imposing more severe dimensional restrictions on the overall design. Objectionable arcing propensities decrease with increase in taper angle, and the 50° taper for the side-fed design permitted increase in field strengths to a level where sustained plasmas were created within the cavities without arc initiation.

Since, in some cases, end clearance is at a premium space can be conserved with the side-fed design, which eliminates the end-feed launcher section. Moreover, iris changes are more readily made with the side-fed apparatus, because the iris is located in a relatively low electric field region, making tightness of fit and alignment less critical than with end feeding.

Figure 15:
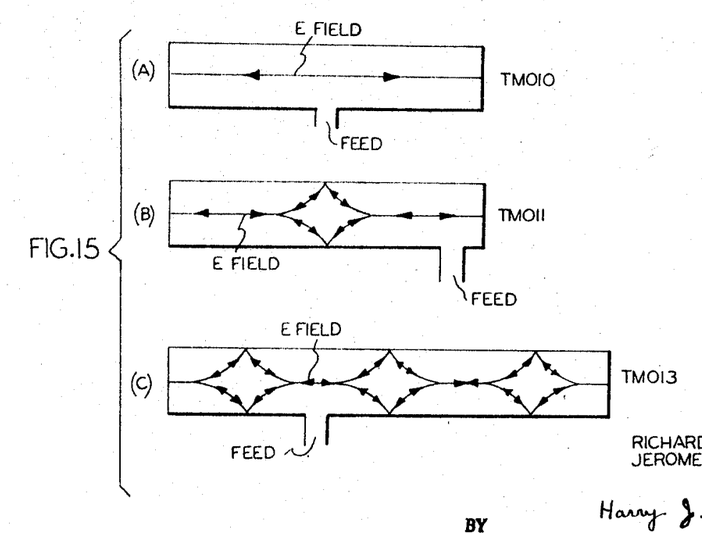
FIG. 15 is a schematic representation of the preselection of several TM modes by choice of waveguide entry location axially with respect to a closed-end cylindrical cavity for (A) $TM_{010}$ mode, (B) $TM_{011}$ mode and (C) $TM_{013}$ mode.

Side power feeding affords some flexibility of operational mode choice dependent upon the point of energy feed-in, and FIG. 15 shows how this is accomplished. Thus, with side feeding at the axial midpoint, as shown in FIG. 15A, the highly desirable $TM_{010}$ mode is obtained. However, if the launcher is shifted adjacent to or near one end of the cavity (e.g., up to about 1/8 of the length away from an end), as shown in FIG. 15B, and the appropriate diameter and length are chosen per FIG. 4, there is easily secured the $TM_{011}$ mode with a single node disposed about mid-length. Likewise, side-coupling at about 1/3 the distance from one cavity end (FIG. 15C) results in the $TM_{013}$ mode, having three nodes internal of the cavity.

Heating cavities utilized in this invention are designed for resonant operation in accordance with recognized principles of microwave equipment design which are not, therefore, elaborated here. In such design, a liberal degree of "cut and try" is usually resorted to if, for no other reason, than to confirm experimentally the operation of a given construction.

The cavities of this invention are, basically, so simple in design, consisting as they do of a cylindrical section 47, or equivalent, provided with frusto-conical end pieces 48 and 49, that a preliminary check of dimensions preselected for optimum $TM_{01n}$ resonance operation, free of interference from neighboring TE modes, as hereinbefore explained with reference to FIG. 6, is readily conducted by simply clamping the end pieces into the cylindrical sweep span at a frequency range of about ±50 mc./sec. on either side of the desired design frequency of operation, and exploring field conditions with a probe inserted into the cavity. The probe signal is supplied as input to an oscilloscope, which produces a signal trace such as that shown in FIG. 16.

Figure 16:
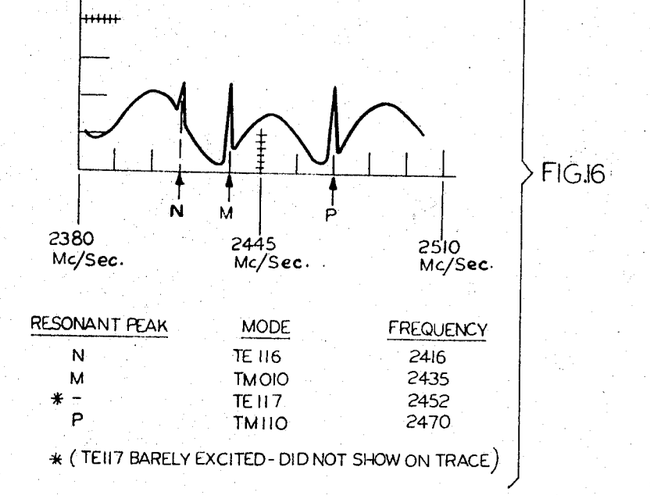
FIG. 16 is an oscillograph trace confirming the existence of resonance for TM operational modes in the microwave frequency range 2380–2510 megacycles/sec. for a typical apparatus (3.75″ dia. x 20″ inside length) of the design shown in FIGS. 11, 12 and 13.

Here the cylindrical cavity measured 3.75'' dia. and 20'' long for the cylindrical section solely (50° tapered end pieces at each end measured 3.28'' additional length collectively). The resonant peaks ascribable to the modes occurring within the operative frequency range show up clearly, peak N of the $TE_{116}$ mode occurring at a frequency of 2416 mc./sec., peak M of the desired $TM_{010}$ mode appearing at 2435 mc./sec. and peak P to $TM_{110}$ appearing at 2470 mc./sec. In this test another mode, $TE_{117}$, was barely excited at 2452 mc./sec. but did not show on the oscilloscope. With this particular cavity, one could be assured of $TM_{010}$ operation without interference from neighboring modes with microwave frequency control as refined as about ±15 mc. operation away from 2435 mc./sec. However, a somewhat better dimensional choice is to be preferred, and can be readily attained by a more judicious use of tabulated data in the literature, supplemented with more cut-and-try confirmation testing.

The following is an operating example of method and apparatus according to this invention utilized to dry a 1900 denier running wool yarn (Bernat Mill, Lot #6922).

The resonant cavity (19'' long) employed was of the center-fed type with iris effecting critical coupling, the "Y" dimension being 0.805''. The operating frequency was 2450 mc./sec. (nominal).

The wool yarn was first wet with water by running it over a 4'' diameter finish roll rotating at 220 r.p.m. and dipping into a water bath containing a wetting agent, in this instance Triton T–400. The yarn thence passed axially through the cavity at a speed of approximately 200 yards/min., giving a residence time within the cavity of 159 millisecs.

Typical results obtained were as follows:

Two foot length samples of the yarn were weighed, the wetted wool weighing 0.1458 gms., whereas the dried wool weighed 0.1288 gms., giving the amount of moisture removed as 0.0170 gm., equal to about 13% by weight on the dry yarn basis.

The measured power supplied to the cavity was 400 watts, and the power required for evaporation was 42 watts, representing a cavity conversion efficiency of approximately 10.5%.

Figure 17:
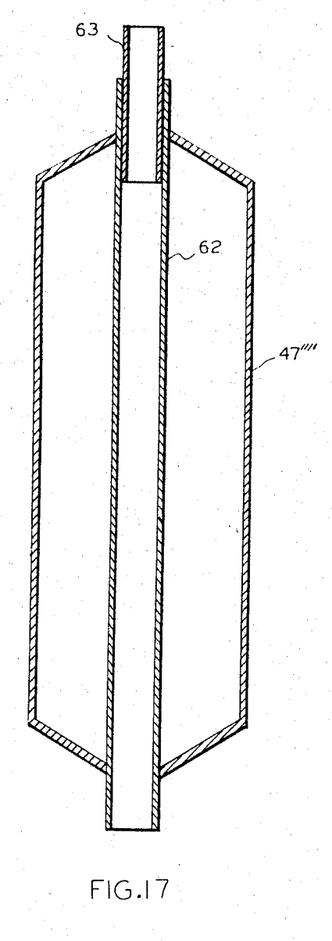
Figure 17A:
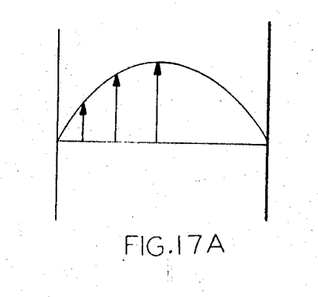
FIGS. 17A and 17B are diagrammatic plots of existing field intensity across the diameter of the cavity of FIG. 17 with resonance maintained where no containment tube is utilized (FIG. 17A) and where such a containment tube is utilized (FIG. 17B).
Figure 17B:
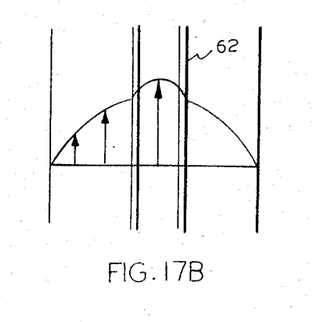

This invention is not limited in application to continuous length materials such as strands, film and similar material but is also entirely suited to the treatment of particulate solids, fluids or the like which have suitable dielectric loss factors L, in which case transit through the heating cavity chamber is constrained by passage through a guidance tube 62 disposed axially of the cavity chamber 47'''' a shown in FIG. 17. Tube 62 should be fabricated from a substantially zero loss material, such as quartz, polyethylene or the like and the employment of such a tube distorts the normal axial electric field, shown in FIG. 17A, only a slight amount, as shown in FIG. 17B. However, employment of the guidance tube does have to be taken into account in selecting the appropriate cavity diameter for resonance as hereinafter described.

Tuning capability is conveniently achieved in the design of FIG. 17 by providing a telescoping quartz tube 63 internal of guidance tube 62 and movable into or out of the cavity to effect sharp resonance selection. An even simpler way of tuning is by taper etching guidance tube 62 itself, effecting tuning by either inserting or withdrawing a greater tube cross section into or out of the cavity.

Thus, a quartz tube 62 of outside dia. 1.081" (30 mm.) and wall thickness of 0.057" was etched interiorly over several inches of its length, reducing the wall thickness evenly to 0.025". Axial shifting of this etched tube to alter the volume of quartz disposed within the chamber in accordance with thickness of the side wall interposed provided a tuning range of 7 mc./sec. for each 1" longitudinal insertion of etched tube length.

In order to achieve resonance at 2450 mc./sec. when the etched quartz guidance tube 62 hereinabove detailed is utilized therewith and inserted completely through the cavity in an axial position, the inside diameter of the cavity required was 3.5000". Conversely, with the quartz tube 62 removed, the resonance frequency would be about 2580 mc./sec.

It might be mentioned that tapered end pieces are still required even when guidance tubes 62 are utilized because, other wise, hot spots develop where the tube clears the cavity ends. Moreover, tapering modifies the influence of the quartz tube to provide a more gradual tuning action than results if the same amount of quartz is simply advanced into a cylindrical cavity section.

It will be apparent that this invention can be modified in numerous respects within the skill of the art without departure from the essential spirit, and it is accordingly intended to be limited only within the scope of the appended claims.

What is claimed is:

1. A resonant cavity microwave dielectric heating apparatus adapted to operate in the $TM_{01n}$ mode, where $n$ is an integer in the range of 0 to 5 comprising an elongated cylindrical chamber provided with a waveguide coupled therewith in a manner propagating the electric (E) field of microwave power introduced therethrough substantially parallel to the axis of said chamber, said waveguide having an iris interposed across its juncture with said chamber of cross-sectional aperture preselected to maintain resonance in said $TM_{01n}$ mode within said chamber during operation as a dielectric heater of process material to be heated having a predetermined dielectric loss factor, and means for said process material insertion and throughput generally within the axial region of said chamber.

2. A resonant cavity microwave dielectric heating apparatus adapted to operate in the $TM_{01n}$ mode, where $n$ is an integer in the range of 0 to 5, comprising an elongated cylindrical chamber provided with a waveguide coupled therewith in a manner propagating the electric (E) field of microwave power introduced therethrough substantially parallel to the axis of said chamber, said waveguide having an iris interposed across its juncture with said chamber of cross-sectional aperture preselected to maintain resonance in said $TM_{01n}$ mode within said chamber during operation as a dielectric heater of process material to be heated having a predetermined dielectric loss factor, open-ended terminal pieces of progressively decreasing transverse cross-section attached to the ends of said chamber with small diameter openings disposed outboard of said chamber, and means for said process material insertion and throughput generally within the axial region of said chamber.

3. A resonant cavity microwave dielectric heating apparatus for running strand and film-form material according to claim 2 wherein said chamber and terminal pieces are slotted longitudinally along a common plane passing through the center of said chamber to constitute said means for said process material insertion and throughput generally within the axial region of said chamber.

4. A resonant cavity microwave dielectric heating apparatus according to claim 3 provided with microwave tuning capability consisting of means varying the transverse cross-section of said chamber within preselected limits.

5. A resonant cavity microwave dielectric heating apparatus according to claim 2 wherein said means for said process material insertion and throughput consists of a tubular conduit fabricated from very low dielectric loss substance mounted substantially co-parallel with the longitudinal axis of said chamber in a preselected region of said electric (E) field of microwave power concentration.

6. A resonant cavity microwave dielectric heating apparatus according to claim 5 wherein said tubular conduit is proportioned in wall thickness throughout a predetermined length so as to interpose a preselected dielectric loading within said chamber and is slidably mounted with respect to said chamber so as to permit disposition of a preselected portion of said tubular conduit internal of said chamber and thereby provide tuning capability.

7. A resonant cavity microwave dielectric heating apparatus according to claim 5 provided with tuning capability consisting of telescopic means fitted slidably with respect to said tubular conduit throughout a predetermined length of said tubular conduit internal of said chamber.

8. A resonant cavity microwave dielectric heating apparatus according to claim 2 wherein said open-ended terminal pieces are frusto-conical in form with openings disposed substantially co-axial with said longitudinal axis of said chamber.

9. A resonant cavity microwave dielectric heating apparatus according to claim 2 wherein said open-ended terminal pieces have an interior surface of generally spherical conformation with openings disposed substantially co-axial with said longitudinal axis of said chamber.

10. A resonant cavity microwave dielectric heating apparatus according to claim 2 adapted to operate in the $TM_{010}$ mode with concomitant inhibition of resonance in the TE mode throughout the frequency range of substantially 2400 to 2500 megacycles/sec. wherein the effective resonant length inclusive of said chamber and said terminal pieces has a preselected magnitude of approximately 5.6" increasing in increments in the range of about 3.6"–3.8" up to a total length of about 45" in direct proportion to the length of axial heating path desired.

11. A resonant cavity microwave dielectric heating apparatus according to claim 2 adapted to operate in the $TM_{010}$ mode wherein said waveguide is coupled with said chamber transverse one end thereof, said waveguide being closed at its terminal end by a conductive wall disposed radially outwards from the axis of said chamber, and the dimensions of said waveguide in the region adjacent said chamber and in a plane transverse thereto are such that all inside surfaces are approximately tangent to a circle of radius $\lambda/4$ drawn with center on the axis of said chamber, and said iris is disposed co-axially with said chamber at the juncture of said waveguide therewith.

12. A resonant cavity microwave dielectric heating apparatus according to claim 2 wherein said waveguide is coupled generally radially through the wall of said chamber via said iris at a point lengthwise of said chamber maintaining resonance at a preselected mode wherein $n$ is one of the group consisting of odd and even integers.

References Cited

UNITED STATES PATENTS 2,640,142  5/1953  Kinn ______________ 219—10.55

FOREIGN PATENTS 1,452,124  8/1966  France.

OTHER REFERENCES

Radar Electronics Fundamentals, Bureau of Ships, Navy Dept., June 1944, pp. 364 to 367.

JOSEPH V. TRUHE, Primary Examiner

L. H. BENDER, Assistant Examiner

U.S. Cl. X.R.

219—10